(12) United States Patent
Westren et al.

(10) Patent No.: US 10,682,840 B2
(45) Date of Patent: Jun. 16, 2020

(54) METHODS AND SYSTEMS FOR INKJET PRINTING ON CO-CURABLE PAINT FILM

(71) Applicant: The Boeing Company, Chicago, IL (US)

(72) Inventors: Anthony M. Westren, Mount Pleasant, SC (US); Mark Richard Brei, Ladson, SC (US); Thomas G. Lawton, Ladson, SC (US); Terrell D. Riley, Summerville, SC (US); Caitlin Elizabeth Kerr, Ladson, SC (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 15/611,552

(22) Filed: Jun. 1, 2017

(65) Prior Publication Data
US 2018/0345646 A1 Dec. 6, 2018

(51) Int. Cl.
*B32B 38/00* (2006.01)
*B64C 1/00* (2006.01)
(Continued)

(52) U.S. Cl.
CPC ............ *B32B 38/145* (2013.01); *B29C 70/54* (2013.01); *B32B 27/12* (2013.01); *B32B 27/34* (2013.01);
(Continued)

(58) Field of Classification Search
CPC combination set(s) only.
See application file for complete search history.

(56) References Cited

U.S. PATENT DOCUMENTS

| 8,545,943 B2 | 10/2013 | Frankenberger et al. |
| 9,452,616 B1 | 9/2016 | Mathis et al. |

(Continued)

FOREIGN PATENT DOCUMENTS

| DE | 19927042 | 12/2000 |
| EP | 2011826 | 1/2009 |

(Continued)

OTHER PUBLICATIONS

Machine generated English abstract of KR 20090119443 downloaded from Espacenet.com dated Jan. 25, 2019.
(Continued)

*Primary Examiner* — Vishal I Patel
(74) *Attorney, Agent, or Firm* — Dascenzo Intellectual Property Law, P.C.

(57) ABSTRACT

Methods for placing an indicia on a composite structure generally include printing the indicia on a first film surface of a coating film, with the coating film being in a partially cured state at the time the printing the indicia is performed, and positioning the coating film on a partially cured composite structure such that a second film surface of the coating film faces and is positioned against a surface of the composite structure, with the second film surface being opposite the first film surface. Finally, the coating film and the composite structure may then be co-cured. Systems for printing an indicia on a composite structure generally include the coating film, a printer configured to print the indicia on the first film surface of the coating film, a securement configured to secure the coating film during printing, and a curing device for co-curing the coating film and the composite structure.

11 Claims, 3 Drawing Sheets

(51) Int. Cl.

| | | |
|---|---|---|
| *B44C 1/10* | (2006.01) | |
| *B64F 5/40* | (2017.01) | |
| *B44C 1/16* | (2006.01) | |
| *B41J 13/10* | (2006.01) | |
| *B41J 3/407* | (2006.01) | |
| *B29C 70/54* | (2006.01) | |
| *B32B 27/12* | (2006.01) | |
| *B32B 27/34* | (2006.01) | |
| *B32B 27/36* | (2006.01) | |
| *B32B 27/38* | (2006.01) | |
| *B32B 27/40* | (2006.01) | |
| *B32B 37/15* | (2006.01) | |
| *B41J 11/00* | (2006.01) | |
| *B41M 3/12* | (2006.01) | |
| *B41M 5/00* | (2006.01) | |
| *B29K 105/24* | (2006.01) | |
| *B29C 37/00* | (2006.01) | |
| *B29L 31/30* | (2006.01) | |

(52) U.S. Cl.
CPC .............. *B32B 27/36* (2013.01); *B32B 27/38* (2013.01); *B32B 27/40* (2013.01); *B32B 37/15* (2013.01); *B41J 3/407* (2013.01); *B41J 11/002* (2013.01); *B41J 13/10* (2013.01); *B44C 1/10* (2013.01); *B44C 1/16* (2013.01); *B64C 1/00* (2013.01); *B64F 5/40* (2017.01); *B29C 2037/0042* (2013.01); *B29K 2105/243* (2013.01); *B29L 2031/3076* (2013.01); *B32B 2250/02* (2013.01); *B32B 2255/10* (2013.01); *B32B 2305/08* (2013.01); *B32B 2305/77* (2013.01); *B32B 2363/00* (2013.01); *B32B 2367/00* (2013.01); *B32B 2375/00* (2013.01); *B32B 2377/00* (2013.01); *B32B 2605/18* (2013.01); *B41M 3/12* (2013.01); *B41M 5/0047* (2013.01); *B41M 5/0064* (2013.01); *B64C 2001/0072* (2013.01)

(56) References Cited

U.S. PATENT DOCUMENTS

| | | |
|---|---|---|
| 2006/0046019 A1 | 3/2006 | Wang et al. |
| 2011/0262721 A1* | 10/2011 | Albertelli .............. B29C 70/086 |
| | | 428/196 |
| 2014/0328694 A1 | 11/2014 | Campbell, Jr. et al. |
| 2014/0329055 A1 | 11/2014 | Berry et al. |
| 2016/0062205 A1 | 3/2016 | Bernhardt |
| 2016/0083871 A1 | 3/2016 | Meure et al. |
| 2016/0200083 A1 | 7/2016 | Halbritter |
| 2017/0008315 A1* | 1/2017 | Dupre ....................... B41J 2/51 |

FOREIGN PATENT DOCUMENTS

| | | | |
|---|---|---|---|
| EP | 3162577 | 5/2017 | |
| JP | H05 81244 | 11/1993 | |
| KR | 20090119443 | 11/2009 | |
| WO | WO 2011/103641 | 9/2011 | |
| WO | WO-2011103641 A1 * | 9/2011 | ............. B32B 21/02 |

OTHER PUBLICATIONS

European Patent Office, Partial European Search Report for related European Patent Application No. 18174554, dated Nov. 14, 2018.
U.S. Appl. No. 15/347,485, filed Nov. 9, 2016, Moriarty et al.
U.S. Appl. No. 15/347,454, filed Nov. 9, 2016, Crothers et al.
U.S. Appl. No. 15/347,375, filed Nov. 9, 2016, Arthur et al.
Printout of webpage, Proell, Inc., "Innovative Pad Printing Inks in Best Quality," downloaded from proell.us on Sep. 1, 2017.
Instructional literature, Proell, Inc., "Pad Printing—Theory and Practice," downloaded from proell.us on Sep. 1, 2017.
European Patent Office, Extended European Search Report for related European Patent Application No. 18174554, dated Mar. 8, 2019.
Machine generated English abstract of DE 19927042 downloaded from Espacenet.com dated May 13, 2019.

* cited by examiner

METHODS AND SYSTEMS FOR INKJET PRINTING ON CO-CURABLE PAINT FILM

FIELD

The present disclosure relates to methods and systems for inkjet printing on co-curable paint film.

BACKGROUND

Aircraft and other vehicles that have been traditionally manufactured from metallic materials are increasingly being made from composite materials, due in part to their improved strength-to-weight ratios. Commercial aircraft and vehicle manufacturers often desire to mark or brand the aircraft or vehicles with information or indicia (e.g., model numbers, company or brand names, etc.), though this aspect has proven challenging with respect to parts made from composite materials (i.e., composite structures). Painting or printing on these composite structures often causes increases in manufacturing process times (e.g., paint operation flow time), thus increasing costs and time required to manufacture the part. In some cases, the part includes complex, three-dimensional curvature, which is difficult to print on. Using traditional inkjet printing techniques may involve the use of a complicated and costly automated array of print heads. Even further, the use of higher resolution print heads may be precluded in many applications due to the size of the print heads, as smaller footprint print heads may be needed to accommodate tight areas of curved surfaces. There thus remains a need for improved and more cost-effective methods and systems for placing indicia on composite structures.

SUMMARY

Presently disclosed methods and systems for placing an indicia on a composite structure may improve upon prior art techniques and may improve processing times as compared to prior art techniques, such as by co-curing the indicia with the composite structure itself, as opposed to prior art techniques involving attempting to print or otherwise place indicia on previously cured composite structures. Such presently disclosed methods generally include printing the indicia on a first film surface of a coating film, with the coating film being in a partially cured state when the printing the indicia is performed. The coating film may then be positioned on the composite structure such that a second film surface of the coating film faces and is positioned against a surface of the composite structure, with the second film surface being opposite the first film surface of the coating film. Finally, the coating film and the composite structure may then be co-cured (e.g., the composite structure may also be partially cured at the time the coating film is positioned on the composite structure, and the composite structure and the coating film may be cured to completion together after the coating film is positioned on the composite structure).

Presently disclosed systems for printing an indicia on a composite structure generally include the coating film, a printer configured to print the indicia on the first film surface of the coating film, and a securement configured to secure the coating film during printing. The coating film and the composite structure are configured to be co-cured after the indicia is printed on the first film surface of the coating film and the coating film is positioned on the composite structure, with said co-curing occurring in a curing device (e.g., an autoclave) in some examples. Aircraft and composite structures including indicia printed according the present disclosure are also disclosed.

DESCRIPTION

Systems and methods for placing an indicia on a composite structure are disclosed. Additionally, composite structures including indicia printed thereon according to the present disclosure, and apparatus including such composite structures, are also disclosed. Generally, presently disclosed systems and methods may allow for placement of indicia (e.g., painting, coating, printing, etc.) that coincides with the rest of the composite manufacturing process, rather than performing such placement of indicia after the composite manufacturing process is otherwise complete. Such systems and methods may thereby decrease paint operation flow times, thus lessening (e.g. improving) the overall duration for creating the composite part.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
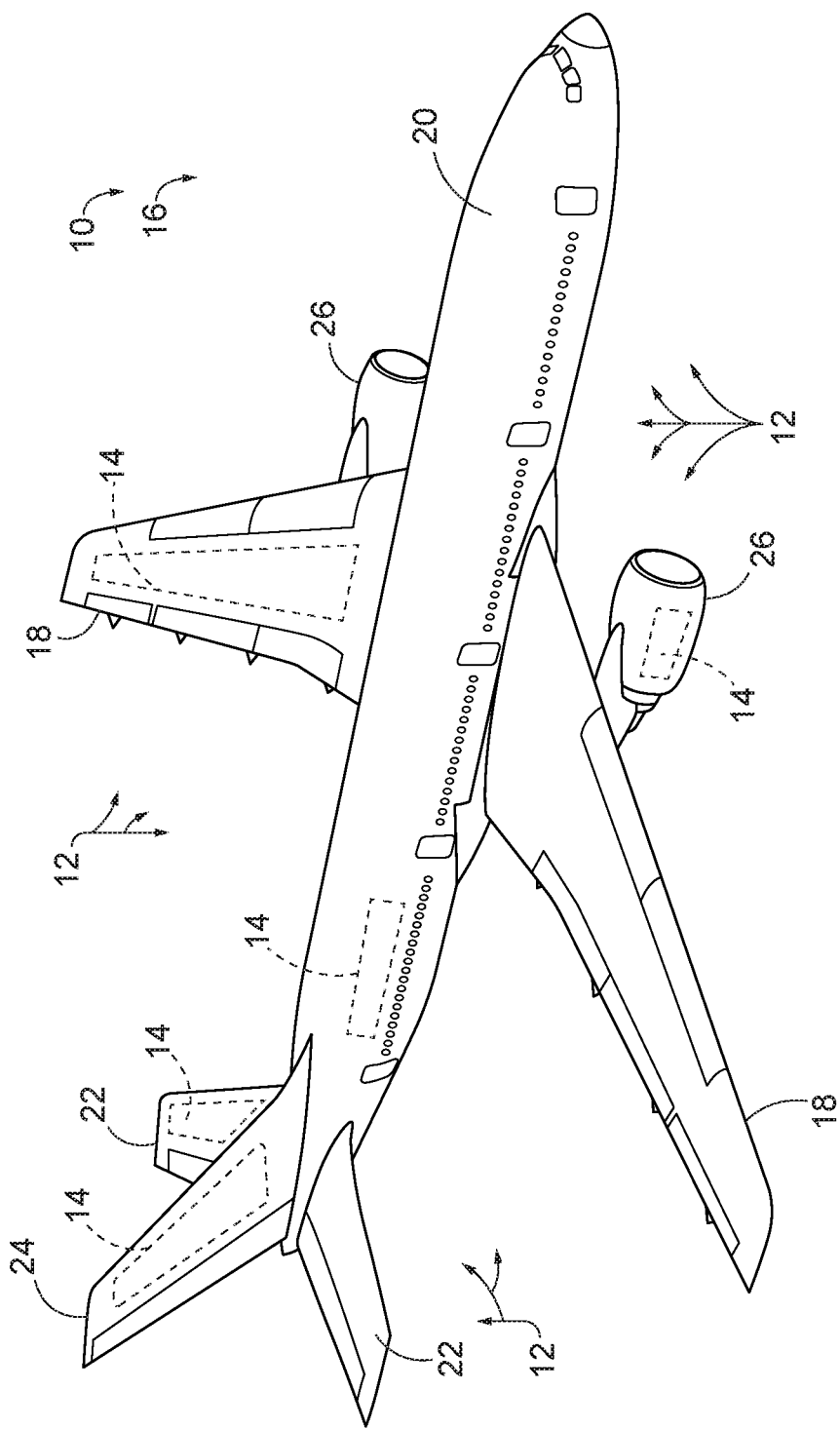
FIG. 1 is a perspective, schematic view of illustrative, non-exclusive examples of an apparatus that may include one or more composite structures having indicia placed thereon according to the present disclosure.

FIG. 1 illustrates an example of an apparatus 10 that may include one or more composite structures 12 with indicia 14 placed thereon. Apparatus 10 is illustrated in the form of an aircraft 16, though apparatus 10 is not limited to aircraft. In examples where apparatus 10 is an aircraft 16, aircraft 16 may take any suitable form, including commercial aircraft, military aircraft, or any other suitable aircraft. While FIG. 1 illustrates an aircraft 16 in the form of a fixed wing aircraft, other types and configurations of aircraft are within the scope of aircraft 16 according to the present disclosure, including (but not limited to) rotorcraft and helicopters. Indicia 14 may include any text, lettering, numbers, logos, images, pictures, patterns, graphics, signs, markings, labels, indications, and/or distinguishing marks that may be printed, painted, deposited, or otherwise placed on one or more composite structures 12 of apparatus 10.

Apparatus 10 (e.g., aircraft 16) may include one or more composite structures 12, which may be formed from one or more layers of fiber-reinforced polymers (e.g., carbon fiber-reinforced polymers) and/or from one or more sandwich panels (e.g., honeycomb panels), one or more of which may be composite panels. Each sandwich panel generally includes a core formed of a relatively lightweight material, sandwiched between two panel skins. Composite structures 12 may include one or more coatings or layers applied to the underlying panels or layers of material. Composite structures 12 may include one or more sandwich panels, joints formed between two or more sandwich panels, and/or three-dimensional structures formed using one or more sandwich panels 12.

As illustrative, non-exclusive examples, composite structures 12 may be utilized in such aircraft structures as wings 18, fuselages 20, horizontal stabilizers 22, vertical stabilizers 24, and engine housings 26; however, other components of aircraft 16 additionally or alternatively may include composite structures 12 such as sandwich panels and/or joints formed between two or more sandwich panels. Other applications in aircraft 16 for composite structures 12 include overhead storage bins, floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, apparatus 10 (including one or more composite structures 12) may include or be a portion of space satellites or aerospace vehicles, transit vehicles, shipping containers, shelters, large antennae or disk reflectors, refrigeration panels, rapid transit floor panels, shipboard electronic deck shelters, cargo pallets, automobile bodies, boats and other marine vehicles, architectural curtain walls, partitions, divider panels, expandable hospital shelters, and/or interior structures of an assembly.

Figure 2:
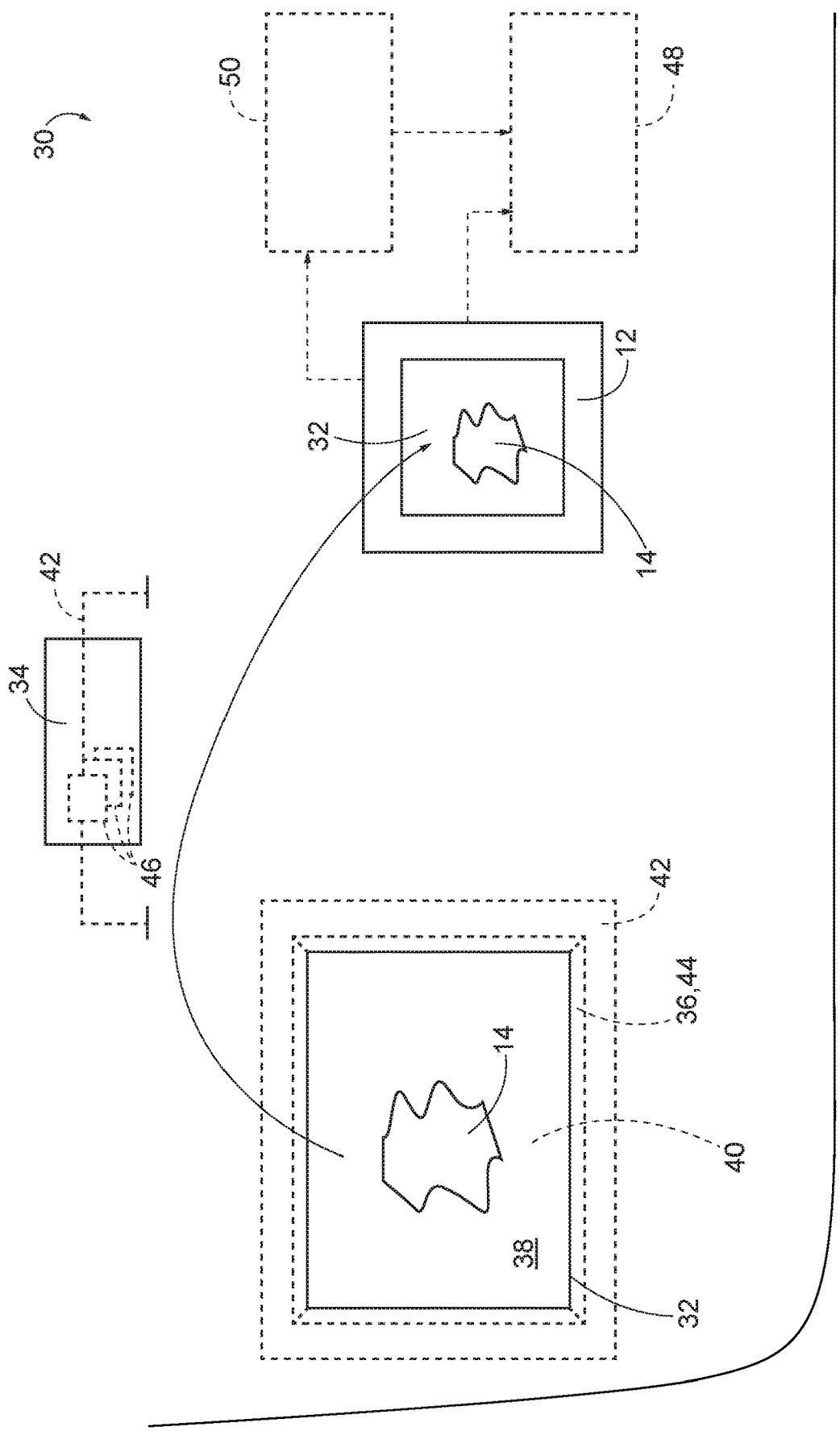
FIG. 2 is a schematic representation of examples of systems for placing indicia on composite structures, according to the present disclosure.

Turning now to FIG. 2, systems 30 for placing indicia 14 on composite structure 12 generally include a coating film 32, a printer 34 configured to print indicia 14 on coating film 32, and a securement 36 configured to secure coating film 32 relative to printer 34 during printing (e.g., while printer 34 is printing indicia 14 on coating film 32). Systems 30 are configured to print indicia 14 on coating film 32 when coating film 32 is in a partially cured state, and further to apply coating film 32 to composite structure 12 (e.g., position coating film 32 on composite structure 12) when composite structure 12 is also in a partially cured state, as will be described in further detail below. Coating film 32 and composite structure 12 are configured to be co-cured (e.g., further cured, together, until both coating film 32 and composite structure 12 are fully cured) after indicia 14 is printed on coating film 32 and after coating film 32 is positioned on composite structure 12. In this manner, when composite structure 12 is fully cured and, for example, removed from a tooling or mold after curing is complete, composite structure 12 includes a cured indicia 14 thereon, without requiring further decorative processes, printing, painting, or other process steps, in some examples. As compared to prior art techniques, indicia 14 thus may be incorporated into composite structure 12 earlier in the processing steps, such that the decorative steps take place at the time of curing, rather than afterwards.

Coating film 32 includes a first film surface 38 and a second film surface 40 opposite first film surface 38. Printer 34 is configured to print indicia 14 on first film surface 38, and coating film 32 is configured to be positioned on composite structure 12 after indicia 14 is printed thereon. In some examples, coating film 32 is configured to be positioned on composite structure 12 such that second film surface 40 faces composite structure 12. In other examples, coating film 32 may be configured to be positioned on composite structure 12 such that first film surface 38 faces composite structure 12.

In some systems 30, coating film 32 is an in-mold coating film that is configured to be placed in a mold or tooling with composite structure 12 during curing. Coating film 32 may be adhesive-backed in some examples. Coating film 32 may be a thin film, and may be pliable enough to conform to the contours of composite structure 12 as coating film 32 is placed onto composite structure 12. Coating film 32 may be formed of any suitable materials, such as polyurethane, polyamide, polyester, and/or epoxy. In some examples, first film surface 38 of coating film 32 is configured such that a contact angle between first film surface 38 and an ink deposited onto first film surface 38 by printer 34 is greater than 45°, greater than 60°, greater than 75°, greater than 90°, greater than 105°, greater than 120°, greater than 135°, and/or greater than 150°. In other words, coating film 32 may be configured relative to the ink deposited thereon such that the ink does not readily wet first film surface 38.

Securement 36 is configured to retain coating film 32 in a substantially flat configuration (e.g., substantially planar, or two-dimensional) during printing, in some examples. For example, coating film 32 may be relatively thin and pliable, and securement 36 may be configured to substantially prevent wrinkling of coating film 32 during printing. Additionally or alternatively, securement 36 may be configured to substantially prevent movement of coating film 32 while indicia 14 is printed on first film surface 38. Printing on coating film 32 in a flat configuration may be advantageous over prior art techniques of printing or painting directly onto composite structure 12. For example, in systems 30 having a complexly-shaped composite structure 12 (e.g., a composite structure having three-dimensional curved surfaces), printing directly on such complex shapes and surfaces may be difficult and expensive, whereas printing directly onto a substantially flat coating film 32 and then applying coating film 32 to composite structure 12 after printing may allow for improved printing resolution with cheaper and less complicated printers 34. Additionally or alternatively, printing on coating film 32 in a substantially flat configuration may facilitate the use of higher resolution print heads that may be difficult or impractical to use when printing on curved surfaces or on surfaces demanding smaller print heads, such as to achieve the desired printer standoff distance from the substrate.

In some examples, securement 36 is configured to secure coating film 32 to a support structure 42 (which may be a support surface 42) and substantially prevent movement of coating film 32 with respect to support structure 42 while indicia 14 is placed (e.g., printed) on first film surface 38 of coating film 32. For example, securement 36 may include tape and/or other adhesives configured to secure coating film 32 to support structure 42 (which may be, for example, a table or other surface).

Additionally or alternatively, securement 36 may include a frame 44 configured to engage coating film 32 while indicia 14 is printed on first film surface 38. In some examples, securement 36 may be configured to secure coating film 32 in a non-flat configuration. For example, printer 34 may be configured to print onto a coating film having a curved surface.

Printer 34 may be an industrial printer, an inkjet printer, a piezoelectric drop-on-demand printer, and/or any suitable printer or other device configured to place indicia on coating film 32. In some systems 30, printer 34 is an inkjet printer with one or more inkjet printing heads 46. For example, printer 34 may include a plurality of ceramic print heads each configured to supply a desired volume of paint or ink droplets to first film surface 38, to print indicia 14 on first film surface 38. Printer 34 may be configured to deposit any suitable type of ink or paint onto coating film 32, such as laser jet toner, wax-based ink, and/or solvent-based inks. Printer 34 is configured for three-axis printing in some systems 30. Compared to six-axis printing systems, currently disclosed systems 30 may achieve substantially similar printing resolution with a less expensive and less complicated printer 34.

While in some systems 30, coating film 32 is held relatively stationary (e.g., by securement 36 and/or support structure 42) while printer 34 moves with respect to coating film 32, in other systems 30, printer 34 is held relatively stationary while coating film 32 is moved with respect to printer 34 to print indicia 14 on coating film 32. For example, in some systems 30, printer 34 may be operably coupled to support structure 42 (which may include, for example, a gantry, a conveyor belt, a linear bearing assembly, a slide, or any other suitable support structure or motion platform), and support structure 42 may be positioned with respect to first film surface 38 of coating film 32 such that printer 34 is configured to be selectively moved with respect to coating film 32 via support structure 42, while printer 34 prints indicia 14 on first film surface 38. In other systems 30, coating film 32 may be operably coupled to support structure 42, and support structure 42 may be positioned with respect to printer 34 such that coating film 32 is configured to be selectively moved with respect to printer 34 via support structure 42, while printer 34 prints indicia 14 on first film surface 38 of coating film 32.

Printer 34 may be configured to print indicia 14 on coating film 32 in a single pass, or in multiple passes. In some systems 30, printer 34 may be configured to selectively set a desired drop size or amount of ink to be deposited onto first film surface 38 while printing indicia 14. For example, printer 34 may be selectively configured to deposit a larger amount of ink onto coating film 32 than would be expected, to account for the heat coating film 32 is exposed to during curing with composite structure 12. In some examples, printer 34 may be selectively configured to increase or decrease the drop size of the ink printed onto coating film 32, in accordance with the expected time and/or temperature in which coating film 32 is expected to be co-cured with composite structure 12.

Some systems 30 include a curing device 48 configured to co-cure composite structure 12 and coating film 32, once coating film 32 is positioned on composite structure 12. As used herein, the term "co-cure" includes any act of curing a composite laminate (e.g., composite structure 12) and simultaneously bonding it to some other uncured material (e.g., coating film 32). Each of composite structure 12 and coating film 32 may be uncured or partially cured when co-curing commences. In examples where composite structure 12 and coating film 32 are both partially cured (i.e., in a partially cured state) they may be at similar levels of cure or at different levels of cure when coating film 32 is applied to composite structure 12 and co-curing begins. As used herein, materials are "partially cured" (or "in a partially cured state") when the material has been impregnated, coated, and/or saturated with a resin or other adhesive, which has changed from a liquid to a pliable solid state, but which has not fully polymerized or hardened. Partially cured materials may be tacky to the touch, in some examples, and/or may require storage below a threshold temperature, to prevent further curing before desired.

In some examples, the level of cure of coating film 32 and/or composite structure 12 may be controlled by the duration and/or the intensity or strength of the curing energy directed to the same, such as via curing device 48. In such examples, the curing energy may be purposefully directed at some or all of composite structure 12 (e.g., one or more discrete portions, such as where indicia 14 may be positioned) and/or coating film 32 to impart desired cure properties, such as levels of cure, prior to co-curing. In other examples, coating film 32 and/or composite structure 12 may be obtained in a partially cured state (e.g., in some systems 30, composite structure 12 may be formed of pre-impregnated composite materials, such as B-stage composite materials), with curing device 48 being utilized to co-cure coating film 32 and composite structure 12 once coating film 32 is placed on composite structure 12. Curing device 48 may be any suitable curing energy source or curing device configured to direct curing energy (e.g., at least partially cure) composite structure 12 and/or coating film 32. For example, curing device 48 may include an autoclave, a light curing device, a heater, an oven, a pressure chamber, and/or an ultraviolet lamp.

In some systems 30, composite structure 12 is engaged with a mold tooling 50 at the time coating film 32 is applied to composite structure and/or when coating film 32 and composite structure 12 are co-cured in or with curing device 48. For example, mold tooling 50 may be configured to at least partially contain composite structure 12 during curing before and/or after coating film 32 is positioned on composite structure 12. In other examples, mold tooling 50 may be an inner mold line tooling, such that composite structure 12 is positioned on mold tooling 50, rather than contained at least partially within it, during curing and/or co-curing of composite structure 12. Composite structure 12 may be configured to be engaged with mold tooling 50 at the time coating film 32 is applied to composite structure 12 in some examples. In other examples, composite structure 12 may be removed from mold tooling 50 while coating film 32 is applied to composite structure.

Figure 3:
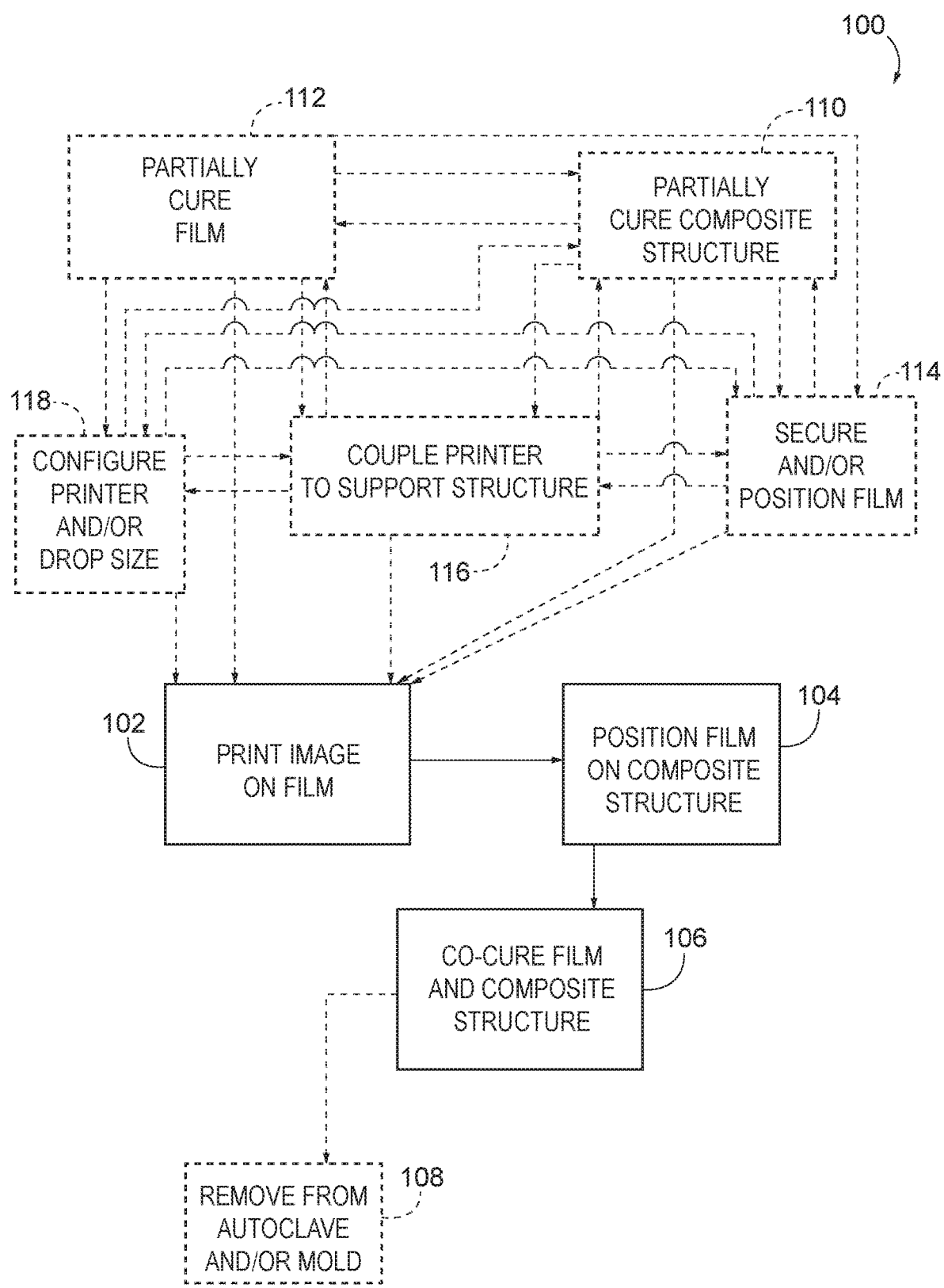
FIG. 3 is a schematic, flow-chart diagram of methods of placing an indicia on a composite structure, according to the present disclosure.

FIG. 3 schematically provides a flowchart that represents illustrative, non-exclusive examples of methods 100 according to the present disclosure. In FIG. 3, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 3 are not limiting and other methods and steps are within the scope of the present disclosure, including methods having greater than or fewer than the number of steps illustrated, as understood from the discussions herein. Methods 100 for placing an indicia (e.g., indicia 14) on a composite structure (e.g., composite structure 12) generally include printing the indicia on a first film surface of a coating film (e.g., first film surface 38 of coating film 32) at 102, positioning the coating film on the composite structure at 104, and co-curing the coating film and the composite structure at 106.

Printing the indicia on the first film surface at 102 is generally performed while the coating film is in a partially cured state. Printing the indicia at 102 may be performed using an inkjet printer or any other suitable type of printer or other device for placing the indicia on the coating film. Printing the indicia at 102 may be performed in a single pass or in multiple passes across the coating film. Printing the indicia at 102 may include three-axis printing in some methods 100. Printing the indicia at 102 may include depositing ink onto the first film surface of the coating film. The ink may be any suitable type of ink or paint or other pigment, including but not limited to laser jet toner, wax-based ink, and/or solvent-based ink. Suitable inks may be obtained from, for example, Toyo Ink America, LLC.

Positioning the coating film on the composite structure at 104 includes positioning the coating film such that it faces and is positioned against a surface of the composite structure. Generally, the coating film is positioned on the composite surface such that the indicia faces outward, away from the composite surface. In other words, the coating film may be placed on the composite structure such that a second film surface (e.g., second film surface 40) faces the composite structure, while the first film surface with the indicia printed thereon faces away from the composite structure. Though in some methods, the coating film may be positioned on the composite structure such that the first film surface (e.g., the side of the coating film with the indicia printed thereon) faces the composite structure. The coating film (e.g., the first film surface or the second film surface of the coating film) may be said to be facing or adjacent or against the composite surface even when one or more coatings, adhesive, or likewise are positioned immediately between the coating film and the composite surface. Positioning the coating film on the composite structure at 104 is generally performed at a time when both the coating film and the composite structure are in a partially cured state.

Co-curing the composite structure and the coating film at 106 may be performed in or with any suitable curing device (e.g., curing device 48), such as in an autoclave. The coating film and composite structure are engaged with a mold tooling (e.g., mold tooling 50) during co-curing at 106, in some examples. For example, the coating film may be positioned on the composite structure while the composite structure is engaged with the mold tooling (e.g., at least partially contained within, or positioned on the mold tooling), and the coating film and composite structure together may be co-cured in this arrangement. After the co-curing at 106 is complete (e.g., when both the composite structure and the coating film are in a fully cured state), the composite structure may be removed from the curing device and/or from the mold tooling at 108, with the indicia being effectively printed on the composite structure at the time it is done curing, rather than requiring further painting or processing times to apply such indicia to the part.

Some methods 100 include partially curing the composite structure at 110 and/or partially curing the coating film at 112 prior to the positioning the coating film on the composite structure at 104 and prior to the printing the indicia on the coating film at 102. Other methods 100 may not include one or both of these steps, as the coating film and/or the composite structure (or materials from which it is formed) may be obtained from the manufacturer in a partially cured state in some examples. In methods 100 that include partially curing the composite structure at 110, the composite structure may be cured to a degree of 10-50%, 25-50%, 10-75%, 50-75%, and/or 10-90% of a fully cured state. For example, partially curing the composite structure at 110 may include curing the composite structure to a degree of cure that is 10% or more, 20% or more, 30% or more, 40% or more, 50% or more, 60% or more, 70% or more, 80% or more, and/or 90% or more of a fully cured state. Similarly, in methods 100 that include partially curing the coating film at 112, the coating film may be cured to a degree of 10-50%, 25-50%, 10-75%, 50-75%, and/or 10-90% of a fully cured state. For example, partially curing the coating film at 112 may include curing the coating film to a degree of cure that is 10% or more, 20% or more, 30% or more, 40% or more, 50% or more, 60% or more, 70% or more, 80% or more, and/or 90% or more of a fully cured state.

Some methods 100 include securing the coating film at 114, such as with a securement (e.g., securement 36), which may include securing the coating film to a support surface or support structure (e.g., support structure 42). Securing the coating film at 114 may include securing the coating film such that it is in a substantially flat (e.g., planar) configuration and such securing is generally performed prior to the printing the indicia on the coating film at 102. Advantageously, such methods may provide for printing on a substantially flat surface and then applying the coating film to a curved surface (e.g., the composite structure), rather than printing directly on the curved surface.

Securing the coating film at 114 may include securing the coating film such that it is substantially prevented from wrinkling and/or moving during the printing the indicia on the coating film at 102. For example, the coating film may be secured at 114 by taping, adhering, or otherwise selectively and temporarily securing the coating film to a support structure such that the coating film is substantially prevented from moving with respect to the support structure while the indicia is printed on the coating film at 102. The printing the indicia on the coating film at 102 may be performed by moving the thusly secured coating film with respect to a printer (e.g., printer 34) and/or by moving the printer with respect to the secured coating film. In some methods 100, securing the coating film at 114 includes securing the coating film using a frame that is configured to hold the coating film taut and stable during printing. In some methods 100, securing the coating film at 114 includes securing the coating film to a gantry or other motion platform, and printing the indicia at 102 includes moving the coating film and gantry with respect to the printer.

Additionally or alternatively, some methods 100 include operably coupling the printer to a support structure at 116. Said support structure may be positioned with respect to the coating film (which may also be secured, as described above) such that the printer is configured to be selectively moved with respect to the coating film via the support structure (e.g., a gantry or other structure) while the indicia is printed on the coating film at 102. Such methods may also include positioning the coating film with respect to the support structure such that the printer is configured to print the indicia on the first film surface while operably coupled to the support structure at 116.

Some methods 100 include configuring the printer and/or ink droplet size at 118. For example, configuring the printer and/or ink droplet size at 118 may include selecting a desired drop size or amount of an ink deposited onto the first film surface during the printing the indicia on the first film surface at 102 to account for heat during the co-curing of the coating film and the composite structure at 106. Configuring the printer at 118 may include configuring each of a plurality of print heads (e.g., ceramic print heads) to supply a desired volume of paint droplets to the first film surface during the printing the indicia on the first film surface. Such presently disclosed methods 100 may be advantageous over prior art printing techniques, in terms of cost, time, resolution, color-matching, and ease.

Illustrative, non-exclusive examples of inventive subject matter according to the present disclosure are described in the following enumerated paragraphs:

A1. A method for placing an indicia on a composite structure, the method comprising:

printing the indicia on a first film surface of a coating film, wherein the coating film is in a partially cured state when the printing the indicia is performed;

positioning the coating film on the composite structure such that the coating film faces and is positioned against a surface of the composite structure; and co-curing the coating film and the composite structure.

A1.1. The method of paragraph A1, wherein the coating film is an in-mold coating film.

A1.2. The method of any of paragraphs A1-A1.1, wherein the coating film comprises a second film surface opposite the first film surface, and wherein the positioning the coating film on the composite structure comprises positioning the second film surface against and facing the composite structure.

A2. The method of any of paragraphs A1-A1.2, wherein the co-curing comprises co-curing the coating film and the composite structure in a curing device.

A2.1. The method of paragraph A2, wherein the co-curing the coating film and the composite structure in the curing device comprises co-curing the coating film and the composite structure in an autoclave.

A3. The method of any of paragraphs A1-A2.1, wherein the co-curing comprises co-curing the coating film and the composite structure while the composite structure is engaged with a mold tooling and while the coating film is engaged with the composite structure.

A3.1. The method of paragraph A3, further comprising removing the composite structure from the mold tooling after the co-curing the coating film and the composite structure, wherein the coating film and the composite structure are in a fully cured state at the time the removing the composite structure from the mold tooling is performed.

A3.2. The method of any of paragraphs A3-A3.1, wherein the co-curing comprises co-curing the coating film and the composite structure while the coating film and the composite structure are at least partially contained within the mold tooling.

A3.3. The method of any of paragraphs A3-A3.2, wherein the co-curing comprises co-curing the coating film and the composite structure while the coating film and the composite structure are engaged with a mold tooling.

A4. The method of any of paragraphs A1-A3.3, wherein the composite structure is in a partially cured state at the time the positioning the coating film on the composite structure is performed.

A5. The method of any of paragraphs A1-A4, further comprising partially curing the composite structure, wherein the partially curing the composite structure is performed prior to the positioning the coating film on the composite structure.

A5.1. The method of paragraph A5, wherein the partially curing the composite structure comprises partially curing the composite structure to a degree of 10-50%, 25-50%, 10-75%, 50-75%, and/or 10-90% of a fully cured state.

A5.2. The method of paragraph A5 or A5.1, wherein the partially curing the composite structure comprises partially curing the composite structure to a degree of cure that is 10% or more, 20% or more, 30% or more, 40% or more, 50% or more, 60% or more, 70% or more, 80% or more, and/or 90% or more of a fully cured state.

A6. The method of any of paragraphs A1-A5.2, further comprising partially curing the coating film, wherein the partially curing the coating film is performed prior to the printing the indicia on the first film surface.

A6.1. The method of paragraph A6, wherein the partially curing the coating film comprises partially curing the coating film to a degree of 10-50%, 25-50%, 10-75%, 50-75%, and/or 10-90% of a fully cured state.

A6.2. The method of paragraph A6 or A6.1, wherein the partially curing the coating film comprises partially curing the coating film to a degree of cure that is 10% or more, 20% or more, 30% or more, 40% or more, 50% or more, 60% or more, 70% or more, 80% or more, and/or 90% or more of a fully cured state.

A7. The method of any of paragraphs A1-A6.2, further comprising securing the coating film with a securement such that the coating film is substantially flat, wherein the securing the coating film is performed prior to the printing the indicia on the first film surface.

A8. The method of paragraph A7, wherein the securing the coating film comprises securing the coating film such that the coating film is substantially prevented from moving while the printing the indicia on the first film surface is performed.

A9. The method of paragraph A7 or A8, wherein the securing the coating film comprises securing the coating film with tapes or other adhesives.

A10. The method of any of paragraphs A7-A9, wherein the securing the coating film comprises securing the coating film using a frame.

A10.1. The method of any of paragraphs A7-A10, wherein the securing the coating film comprises securing the coating film to a support structure such that the coating film is substantially prevented from moving with respect to the support structure while the printing the indicia on the first film surface is performed.

A10.2. The method of paragraph A10.1, wherein the printing the indicia on the first film surface comprises moving the support structure with respect to a printer configured to perform the printing the indicia on the first film surface.

A11. The method of any of paragraphs A1-A10.2, wherein the surface of the composite structure is a three-dimensional curved surface.

A12. The method of any of paragraphs A1-A11, wherein the printing the indicia is performed with a/the printer comprising an inkjet printing head.

A13. The method of paragraph A12, wherein the inkjet printing head comprises a plurality of ceramic print heads each configured to supply a desired volume of paint droplets to the first film surface during the printing the indicia on the first film surface.

A14. The method of paragraph A12 or A13, wherein the printer is operably coupled to a support structure positioned with respect to the coating film such that the printer is configured to be selectively moved with respect to the coating film via the support structure, during the printing the indicia on the first film surface.

A14.1. The method of paragraph A14, wherein the support structure comprises a gantry.

A14.2. The method of paragraph A12 or A13, wherein the coating film is operably coupled to a support structure positioned with respect to the printer such that the coating film is configured to be selectively moved with respect to the printer via the support structure, during the printing the indicia on the first film surface.

A14.3. The method of paragraph A14.2, wherein the support structure comprises a gantry.

A15. The method of any of paragraphs A1-A14.3, wherein the composite structure comprises a pre-impregnated composite material.

A16. The method of any of paragraphs A1-A15, wherein the composite structure comprises a B-stage composite material.

A17. The method of any of paragraphs A1-A16, wherein the coating film comprises polyurethane.

A18. The method of any of paragraphs A1-A17, wherein the printing the indicia on the first film surface is performed in a single pass.

A18.1. The method of any of paragraphs A1-A17, wherein the printing the indicia on the first film surface is performed in multiple passes.

A19. The method of any of paragraphs A1-A18.1, further comprising selecting a desired drop size or amount of an ink deposited onto the first film surface during the printing the indicia on the first film surface, to account for heat during the co-curing the coating film and the composite structure.

A20. The method of any of paragraphs A1-A19, wherein the printing the indicia on the first film surface comprises depositing an/the ink onto the first film surface, and wherein the ink comprises laser jet toner, a wax-based ink, and/or a solvent-based ink.

A21. The method of any of paragraphs A1-A20, wherein the first film surface of the coating film is configured such that a contact angle between the first film surface and a/the ink deposited onto the first film surface during the printing the indicia on the first film surface is greater than 45°, greater than 60°, greater than 75°, greater than 90°, greater than 105°, greater than 120°, greater than 135°, and/or greater than 150°.

A22. The method of any of paragraphs A1-A21, wherein the printing the indicia on the first film surface comprises three axis printing.

A23. The method of any of paragraphs A1-A22, further comprising:

operably coupling a/the printer to a/the support structure such that the printer is configured to be selectively moved with respect to the coating film via the support structure, during the printing the indicia on the first film surface; and positioning the coating film with respect to the support structure such that the printer is configured to perform the printing the indicia on the first film surface while operably coupled to the support structure.

A24. The method of paragraph A23, wherein the support structure comprises a/the gantry.

B1. A system for printing an indicia on a composite structure, the system comprising:

a coating film having a first film surface and a second film surface opposite the first film surface, wherein the coating film is configured to be positioned on the composite structure, wherein the coating film is in a partially cured state, and wherein the coating film is configured to be positioned on the composite structure when the composite structure is in a partially cured state;

a printer configured to print the indicia on the first film surface of the coating film; and a securement configured to secure the coating film relative to the printer during printing; wherein the coating film and the composite structure are configured to be co-cured after the indicia is printed on the first film surface of the coating film and the coating film is positioned on the composite structure.

B1.1. The system of paragraph B1, wherein the coating film is an in-mold coating film.

B1.2. The system of any of paragraphs B1-B1.1, wherein the coating film is configured to be positioned on the composite structure such that the second film surface faces the composite structure.

B2. The system of any of paragraphs B1-B1.2, further comprising a curing device configured to co-cure the composite structure and the coating film, once the coating film is positioned on the composite structure.

B2.1. The system of paragraph B2, wherein the curing device comprises an autoclave.

B3. The system of any of paragraphs B1-B2.1, further comprising a mold tooling, wherein the composite structure is engaged with the mold tooling.

B3.1. The system of paragraph B3, wherein the composite structure is at least partially contained within the mold tooling when the coating film and the composite structure are co-cured.

B3.2. The system of paragraph B3 or B3.1, wherein the composite structure is configured to be at least partially contained within the mold tooling when the indicia is printed on the first film surface of the coating film and when the coating film is positioned on the composite structure.

B3.3. The system of any of paragraphs B3-B3.2, wherein the coating film is at least partially contained within the mold tooling when the coating film and the composite structure are co-cured.

B3.4. The system of any of paragraphs B3-B3.3, wherein the system is configured such that the coating film is engaged with the mold tooling when the coating film and the composite structure are co-cured.

B4. The system of any of paragraphs B1-B3.4, wherein the securement is configured to retain the coating film in a substantially flat configuration during printing.

B4.1. The system of any of paragraphs B1-B4, wherein the securement comprises tape and/or other adhesives.

B4.2. The system of any of paragraphs B1-B4.1, wherein the securement comprises a frame configured to engage the coating film while the indicia is printed on the first film surface.

B4.3. The system of any of paragraphs B1-B4.2, wherein the securement is configured to substantially prevent movement of the coating film while the indicia is printed on the first film surface.

B4.4. The system of any of paragraphs B1-B4.3, further comprising a support structure, wherein the securement is configured to secure the coating film to the support structure and substantially prevent movement of the coating film with respect to the support structure while the indicia is printed on the first film surface.

B5. The system of any of paragraphs B1-B4.4, further comprising the composite structure.

B5.1. The system of paragraph B5, wherein the composite structure comprises a three-dimensional curved surface, and wherein the coating film is configured to be positioned on the three-dimensional curved surface after the indicia is printed on the first film surface of the coating film.

B5.2. The system of any of paragraphs B5-B5.1, wherein the composite structure comprises a pre-impregnated composite material.

B5.3. The system of any of paragraphs B5-B5.2, wherein the composite structure comprises a B-stage composite material.

B6. The system of any of paragraphs B1-B5.2, wherein the printer comprises an inkjet printing head.

B6.1. The system of paragraph B6, wherein the inkjet printing head comprises a plurality of ceramic print heads each configured to supply a desired volume of paint droplets to the first film surface to print the indicia on the first film surface.

B7. The system of any of paragraphs B1-B6.1, further comprising a/the support structure, wherein the printer is operably coupled to the support structure and the support structure is positioned with respect to the first film surface of the coating film such that the printer is configured to be selectively moved with respect to the coating film via the support structure, while the printer prints the indicia on the first film surface.

B7.1. The system of paragraph B7, wherein the support structure comprises a gantry.

B7.2. The system of any of paragraphs B1-B6.1, further comprising a support structure, wherein the coating film is operably coupled to the support structure and the support structure is positioned with respect to the printer such that the coating film is configured to be selectively moved with respect to the printer via the support structure, while the printer prints the indicia on the first film surface of the coating film.

B7.3. The system of paragraph B7.2, wherein the support structure comprises a gantry.

B8. The system of any of paragraphs B1-B7.1, wherein the coating film comprises polyurethane, polyamide, polyester, and/or epoxy.

B9. The system of any of paragraphs B1-B8, wherein the printer is configured to print the indicia on the first film surface in a single pass.

B9.1. The system of any of paragraphs B1-B8, wherein the printer is configured to print the indicia on the first film surface in multiple passes.

B10. The system of any of paragraphs B1-B9.1, wherein the printer is configured to selectively set a desired drop size or amount of an ink deposited onto the first film surface while printing the indicia on the first film surface, to account for heat during the co-curing the coating film and the composite structure.

B11. The system of any of paragraphs B1-B10, wherein the printer is configured to deposit laser jet toner, a wax-based ink, and/or a solvent-based ink onto the first film surface of the coating film.

B12. The system of any of paragraphs B1-B11, wherein the printer is configured for three axis printing.

B13. The system of any of paragraphs B1-B12, wherein the first film surface of the coating film is configured such that a contact angle between the first film surface and an ink deposited onto the first film surface by the printer is greater than 45°, greater than 60°, greater than 75°, greater than 90°, greater than 105°, greater than 120°, greater than 135°, and/or greater than 150°.

C1. A composite structure comprising an indicia, wherein the indicia is placed on the composite structure according to the method of any of paragraphs A1-A23.

C2. A composite structure comprising an indicia, wherein the indicia is placed on the composite structure using the system of any of paragraphs B1-B13.

D1. An aircraft comprising the composite structure of any of paragraphs C1-C2.

E1. Use of the system of any of paragraphs B1-B13 to apply an indicia to a composite structure.

E2. Use of the system of any of paragraphs B1-B13 to apply an indicia to an automotive or other vehicle, a boat or other marine craft, an aircraft, and/or a spacecraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and systems, and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A method for placing an indicia on a composite structure, the method comprising:
   printing the indicia on a first film surface of a coating film, wherein the coating film is in a partially cured state when the printing the indicia is performed;
   positioning the coating film on the composite structure such that a second film surface of the coating film faces and is positioned against a surface of the composite structure, wherein the second film surface is opposite the first film surface of the coating film; and
   co-curing the coating film and the composite structure.

2. The method according to claim 1, wherein the co-curing comprises co-curing the coating film and the composite structure while the coating film and the composite structure are engaged with a mold tooling.

3. The method according to claim 1, further comprising partially curing the composite structure, wherein the partially curing the composite structure is performed prior to the positioning the coating film on the composite structure.

4. The method according to claim 3, wherein the partially curing the composite structure comprises partially curing the composite structure to a degree of at least 50% of a fully cured state.

5. The method according to claim 1, further comprising securing the coating film such that the coating film is substantially flat, wherein the securing the coating film is performed prior to the printing the indicia on the first film surface, wherein the securing the coating film comprises securing the coating film such that the coating film is substantially prevented from moving with respect to a support structure while the printing the indicia on the first film surface is performed.

6. The method according to claim 1, wherein the printing the indicia is performed with a printer comprising an inkjet printing head configured to supply a desired volume of paint droplets to the first film surface during the printing the indicia on the first film surface.

7. The method according to claim 6, further comprising:
   operably coupling the coating film to a support structure such that the coating film is configured to be selectively moved with respect to the printer via the support structure, during the printing the indicia on the first film surface; and positioning the printer with respect to the support structure such that the printer is configured to perform the printing the indicia on the first film surface while the coating film is operably coupled to the support structure.

8. The method according to claim 1, wherein the printing the indicia on the first film surface is performed in a single pass.

9. The method according to claim 1, further comprising selecting a desired drop size or amount of an ink deposited onto the first film surface during the printing the indicia on the first film surface, wherein the desired drop size is selectively increased to account for heat during the co-curing the coating film and the composite structure.

10. The method according to claim 1, wherein the printing the indicia on the first film surface comprises three axis printing.

11. The method according to claim 1, wherein the coating film is an adhesive film.

\* \* \* \* \*